(12) United States Patent
Mayer

(10) Patent No.: US 6,412,874 B1
(45) Date of Patent: Jul. 2, 2002

(54) MOTOR VEHICLE SEAT COMPONENT PANEL WITH INTEGRATED CLASPS, SOCKETS AND CONDUCTORS

(75) Inventor: René Mayer, München (DE)

(73) Assignee: Bertrand Faure Sitztechnik GmbH & Co KG, Stadthagen (DE)

( * ) Notice: Subject to any disclaimer, the term of this patent is extended or adjusted under 35 U.S.C. 154(b) by 0 days.

(21) Appl. No.: 09/660,523

(22) Filed: Sep. 13, 2000

(30) Foreign Application Priority Data

Sep. 14, 1999 (DE) .......................................... 199 43 890

(51) Int. Cl.[7] .................................................. A47C 7/02
(52) U.S. Cl. ............................ 297/452.52; 297/452.55; 297/452.18
(58) Field of Search ..................... 297/452.18, 217.3, 297/452.52, 452.49, 452.55

(56) References Cited

U.S. PATENT DOCUMENTS 6,093,910 A * 7/2000 McClintock et al.

6,199,948 B1 * 3/2001 Bush et al.

FOREIGN PATENT DOCUMENTS

DE 19714235 10/1998

\* cited by examiner

Primary Examiner—Milton Nelson, Jr.
(74) Attorney, Agent, or Firm—Flanagan & Flanagan; John R. Flanagan

(57) ABSTRACT

A component of a motor vehicle seat includes an under spring structure, a panel having a support surface for supporting a cushion padding of the motor vehicle seat thereon, a plurality of clasps on the panel attaching the panel onto the under spring structure to support the panel thereon, at least one first socket on the panel for connection to at least one seat subassembly required for a desired seat function at least one second socket on the panel for connection to an on-board network of the motor vehicle, and at least one conductor imbedded into the panel and extending between and interconnecting the first and second sockets. The panel is preferably made of a suitable synthetic moldable material ouch that the first and second sockets can be integrally famed with or integrated into the panel and the conductor molded into the panel.

19 Claims, 6 Drawing Sheets

US 6,412,874 B1

MOTOR VEHICLE SEAT COMPONENT PANEL WITH INTEGRATED CLASPS, SOCKETS AND CONDUCTORS

BACKGROUND OF THE INVENTION

1. Field of the Invention

The present invention generally relates to a seat of a motor vehicle and, more particularly, is concerned with a seat component panel having clasps for attaching the panel onto an under spring structure of the seat to support the panel and sockets and conductors for connecting subassemblies required for desired seat functions to an on-board network of the motor vehicle.

2. Description of the Prior Art

Motor vehicle seats are being equipped with increasingly greater comfort. Motor-driven functions, such as seating height and length adjustments, lordosis support adjustment, etc., which earlier could only be found in cars of the luxury class, are increasingly entering motor vehicles of lower price sectors. In addition, new functions continuously are being added, such as, for example, adaptive vibration damping and massage devices. This has led to an increase in complexity of the cabling for the connection of the required adjustment motors, sensors, counters, etc. with the power supply and control electronics of the on-board network. This requires the laying of cable harnesses under tight space conditions within the seat structure such that the mounting and assembly expenditures are increased to a considerable degree.

Consequently, there is a need for innovations that will avoid the problems of complex and expensive laying of cable harnesses for linking of the seat subassemblies required for the various functions to the on-board network.

SUMMARY OF THE INVENTION

The present invention overcomes the aforementioned problems in a motor vehicle seat by providing a seat component panel with clasps for attaching the panel onto the under spring structure of the seat. The panel also has integrated into it at least one socket for the connection of the seat subassemblies required for the desired seat functions and at least one socket for the connection to an on-board network of the motor vehicle. The sockets are interconnected through conductors molded into the panel.

Due to the solution of the present invention, the time required for assembly of the seat can be shortened since the laying of cable harnesses becomes superfluous. Since the otherwise customary cable harnesses are no longer required, moreover, the available space within the seat component is also increased. Furthermore, cable, breakages are avoided since the conductors extend within the synthetic panel under protection. This increases the operational reliability of the seat functions. In addition, the panel serves as a supporting surface for the cushion padding of the seat. Here the protective webbing in the foam part of the cushion padding can also be omitted since the panel shields the cushion padding against the under spring structure.

Accordingly, the present invention is directed to a component of a motor vehicle seat which comprises: a panel having opposite upper and lower surfaces, the upper surface being adapted for supporting a cushion padding of a motor vehicle seat; means in the form of a plurality of clasps attached on the lower surface of the panel and extending therefrom, the clasps being adapted for attaching the panel onto an under spring structure of the motor vehicle seat to support the panel upon the under spring structure; and at least one first socket on the lower surface of the panel and being adapted for connecting to at least one seat subassembly required for a desired seat function. The component further comprises at least one second socket on the lower surface of the panel for connecting to an on-board network of the motor vehicle and at least one conductor in the panel extending between and connected to the first and second sockets. The panel is preferably made of a suitable synthetic material such that said first and second sockets are integrally formed therewith and the conductor is molded into the panel.

The present invention i's further directed to a component of a motor vehicle seat which comprises: an under spring structure for supporting a cushion padding of a motor vehicle seat; a panel having opposite upper and lower surfaces and adapted for supporting the cushion padding on the upper surface of the panel; means on the lower surface of the panel for fastening the panel upon the under spring structure so as to position the upper surface of the panel in an orientation for receiving the cushion padding thereon spaced above the under spring structure; and means on the lower surface of the panel for interconnecting at least one seat subassembly required for a desired seat function with an on-board network.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
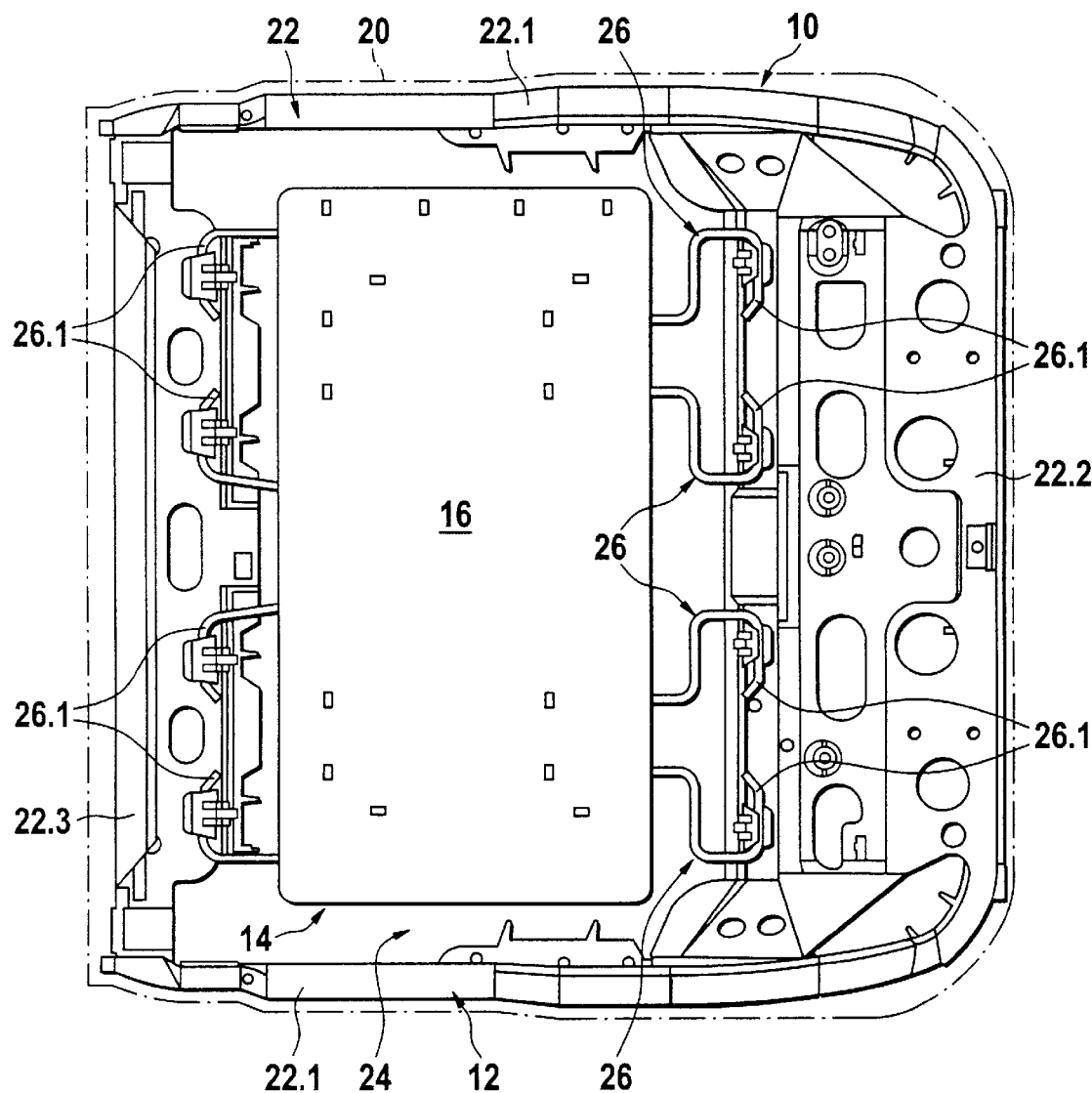
FIG. 1 is a top plan view of a seating shell of a component of a motor vehicle seat with a panel of the present clasped onto the seating shell.
Figure 2:
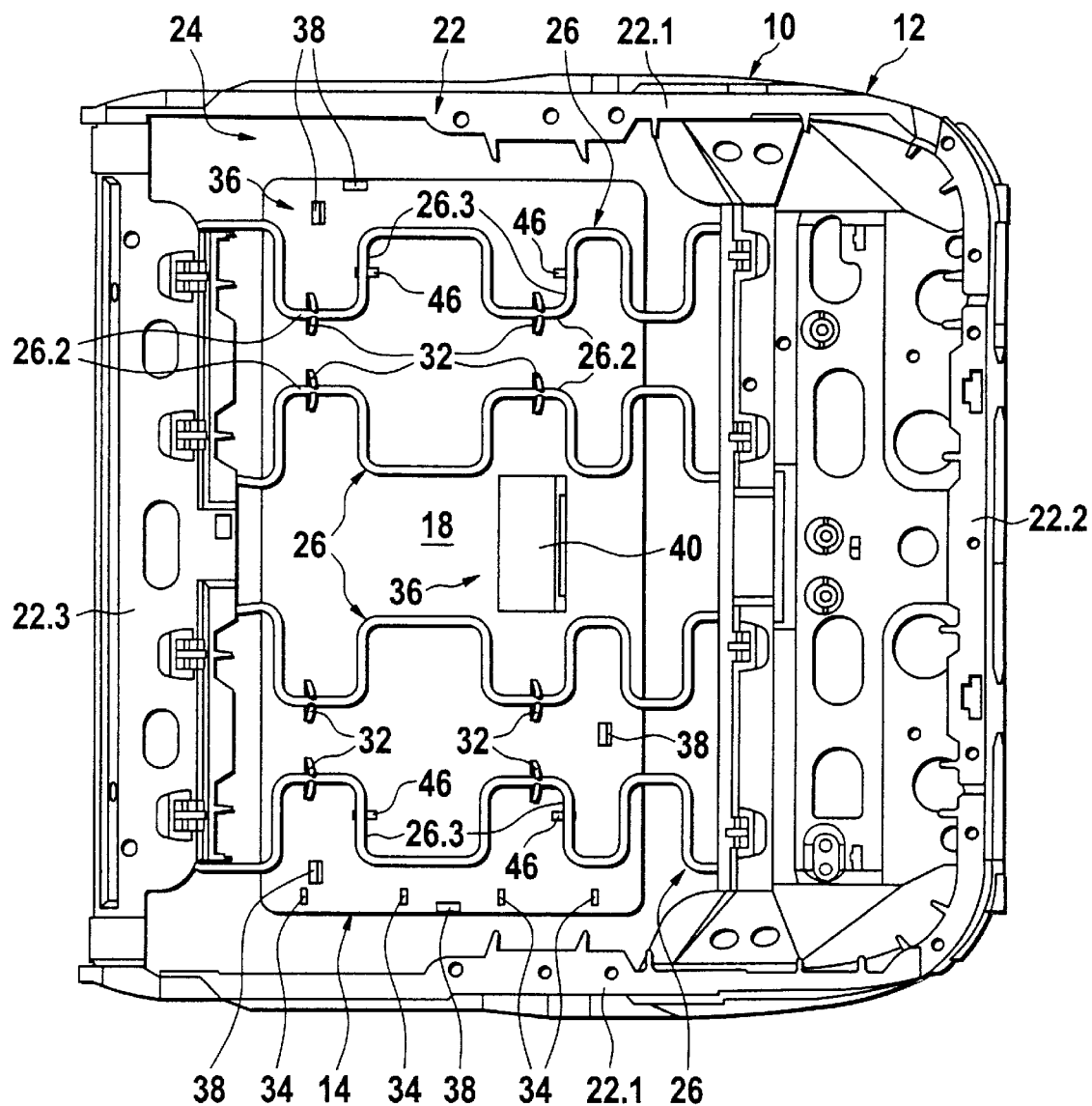
FIG. 2 is a bottom plan view of the seating shell and panel of FIG. 1.
Figure 3:
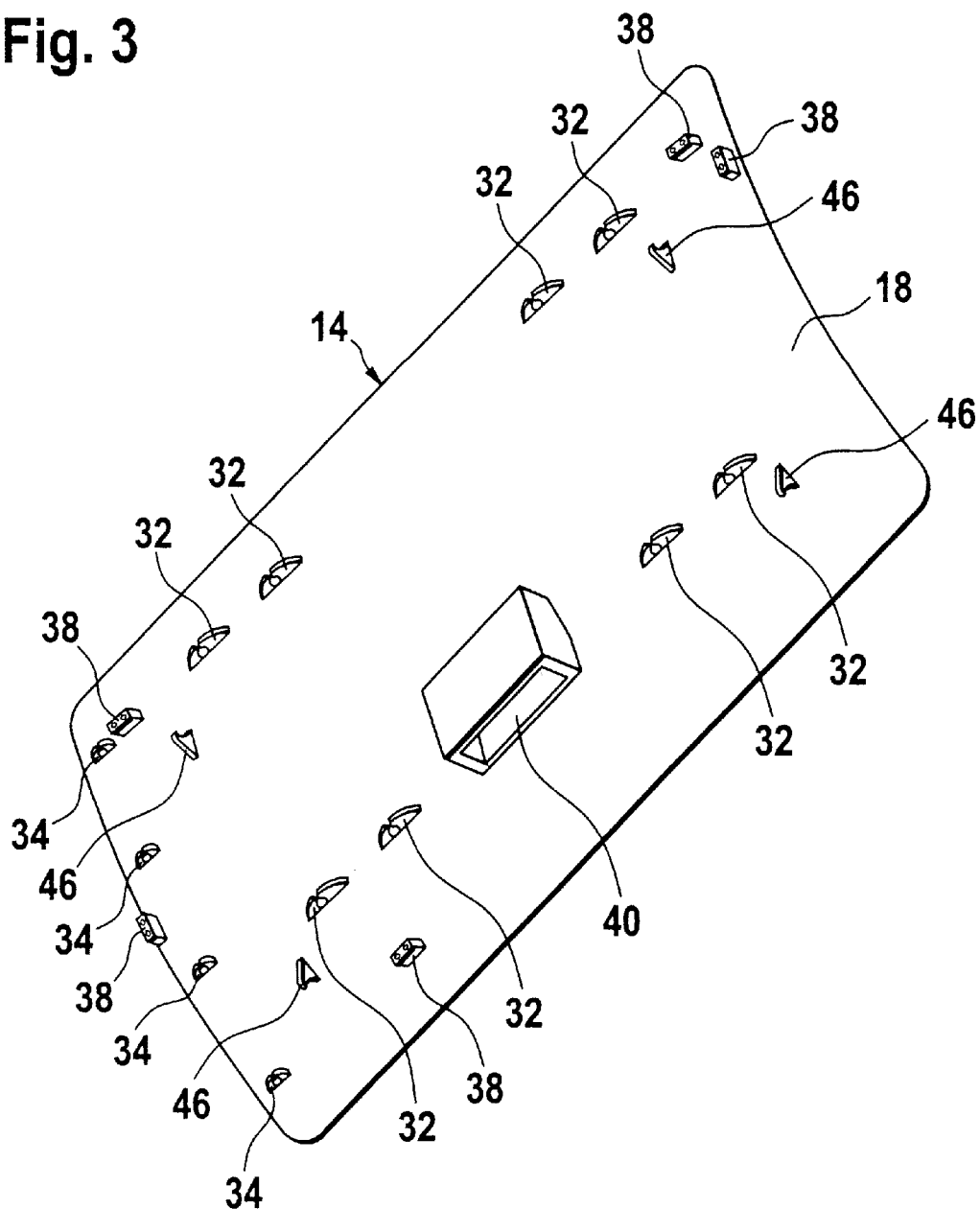
FIG. 3 is a perspective view of the panel by itself.
Figure 4:
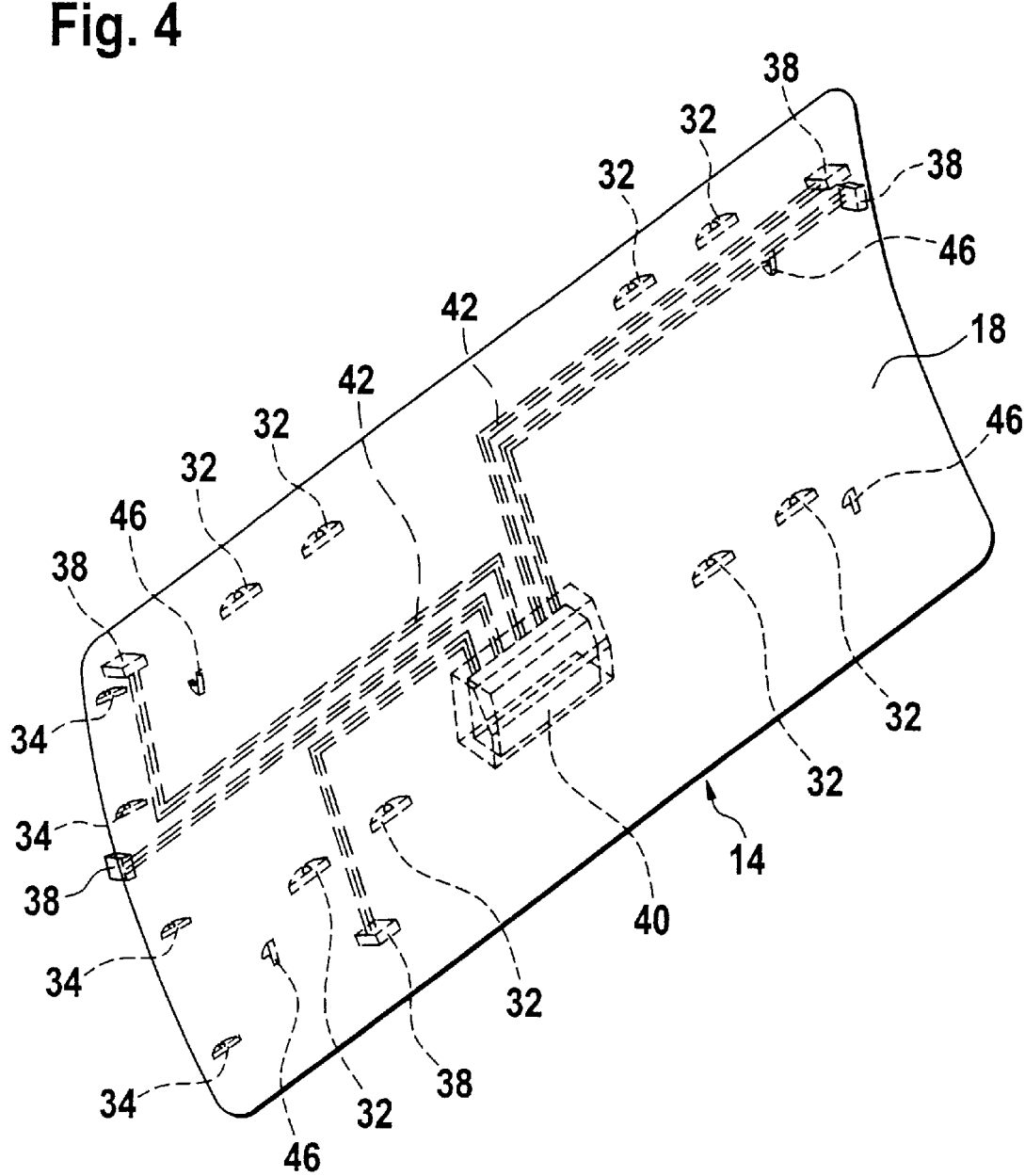
FIG. 4 is another perspective view of the panel similar to FIG. 3 with the integrated electrical conductors shown in dashed line a form in the panel.
Figure 5:
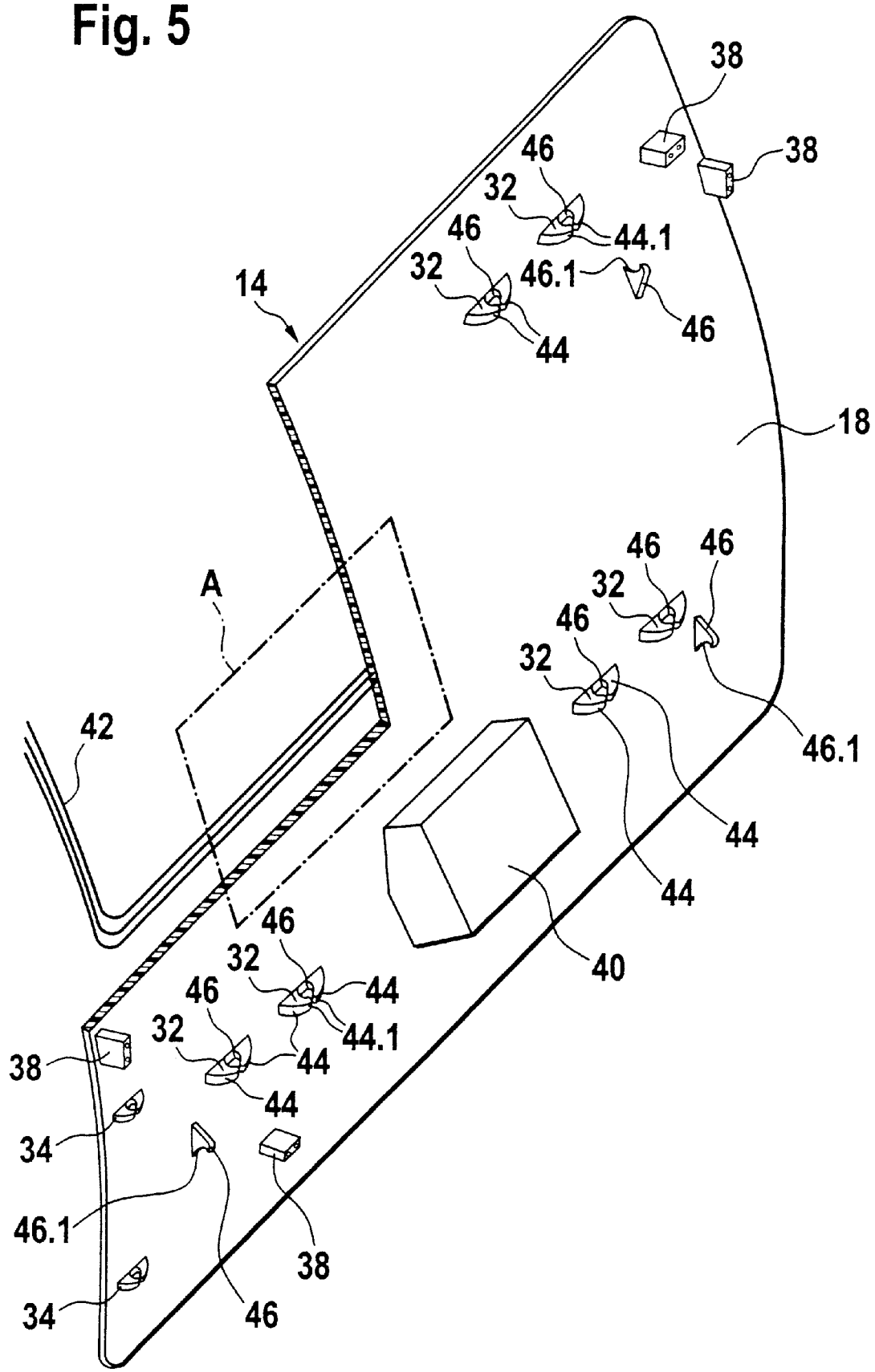
FIG. 5 is an enlarged perspective view of the panel with a corner portion removed to show the conductors.

Referring to the drawings and particularly to FIGS. 1 and 2, there is schematically illustrated a component, generally designated 10, of motor vehicle seat. The seat component 10 includes an under spring structure 12 which is per se known in the prior art and a panel 14 which constitutes the present invention and has opposite upper and lower surfaces 16, 18 and is adapted at its upper surface 16 to support thereon a seat cushion padding 20 which is per se known in the prior art and shown only in dashed outline form. The under spring structure 12 typically includes a seating shell 22 typically realized as a formed metal sheet part having a central cut-out region 24 and a plurality of resiliently yieldable elements preferably in the form of Fowi (or formed wire) suspension springs 26, for instance four in number, spanning the central region 24 of the seating shell 22 and having opposite ends 26.1 mounted on the seating shell 22. The panel 14 is disposed over the suspension springs 29 above the central region 24 of the seating shell 22. The panel 14 preferably is made of a suitable synthetic material by conventional molding techniques and has a curved profile formed to conform with the compression contour of the seat component 10 so as to improve the comfort thereof.

Referring to FIGS. 1–6, in accordance with the present invention, the panel 14 also has fastening means in the form of at least one and preferably a plurality of first clasps 32 provided on the lower surface 18 of the panel 14 and a plurality of second clasps 34 also provided on the lower surface 18 of the panel 14. The first clasps 32 which extend downwardly from the panel 14 are adapted for engaging portions 26.2 of the suspension springs 26 of the under spring structure 12 between the opposite ends 26.1 thereof so as to secure the panel 14 upon the suspension springs 26 and thereby position the upper surface 16 of the panel 14 in an orientation for supporting the seat cushion padding 20 thereon spaced above the under spring structure 12 as diagrammatically depicted in FIG. 1. The second clasps 34 which also extend downwardly from the lower surface 18 of the panel 14 are used for fastening other structural parts (not shown) on the panel 14, for example, for laying and fixing in the desired precise position a tube leading to a provided lordosis support. The provision of second clasps 34 on the panel 14 makes possible a simple and table laying of these other structural parts.

Therefore, from the foregoing description, it can be readily understood that the panel 14 preferably is clasped onto the suspension springs 26. By way of example, the panel 14 may be equipped with eight of the first clasps 32 whose formation is most clearly shown in FIG. S. Each of these first clasps 32 is formed by a pair of spring latches 44 spaced apart from one another and projecting perpendicularly from the lower surface 18 of the panel 14. The configuration and spacing apart of these spring latches 44 of each pair thereof is selected such that in an inner region 46 between them adjacent to the lower surface 18 of the panel 14 they can receive the diameter of a respective one of the suspension springs 26. At their upper ends 44.1 the spring latches 44 of each pair thereof are spaced apart by a distance slightly less than the diameter of the respective one of the suspension springs 26. When sliding the panel 14, onto the suspension springs 26 the spring latches 44 of the pairs thereof are therefore slightly spread apart and then subsequently snap in behind the suspension springs 26. In such manner, the panel 14 is thus fixed in the direction of the seat width extending between the opposite sides 22.1 of the seating shell 22, as best seen in FIG. 2.

In order to avoid sliding of the panel 14 on the suspension springs 26 in the direction of the seat length extending between the front and rear ends 22.2, 22.3 of the seating shell 22 as seen in FIG. 2, two pairs of small holding supports 46 are provided as also seen in FIG. 2 adjacent an outermost pair of the suspension springs 26 nearest to the opposite sides 22.1 of the seating shell 22. The respective shapes of the small holding supports 46 are most clearly seen in FIG. 5. The small holding supports 46 provide notches 46.1 to receive the diameter of the respective ones of the suspension springs 26. The small holding supports 46 of a pair thereof are spaced apart at such distance that, after the panel 14 is mounted, they are each in contact on one of the meander-form bend portions 26.3 of a respective one of the suspension springs 26 which is oriented transversely to each of the portions 26.2 thereof and act as stoppers in the opposite directions along the seat length.

Figure 6:
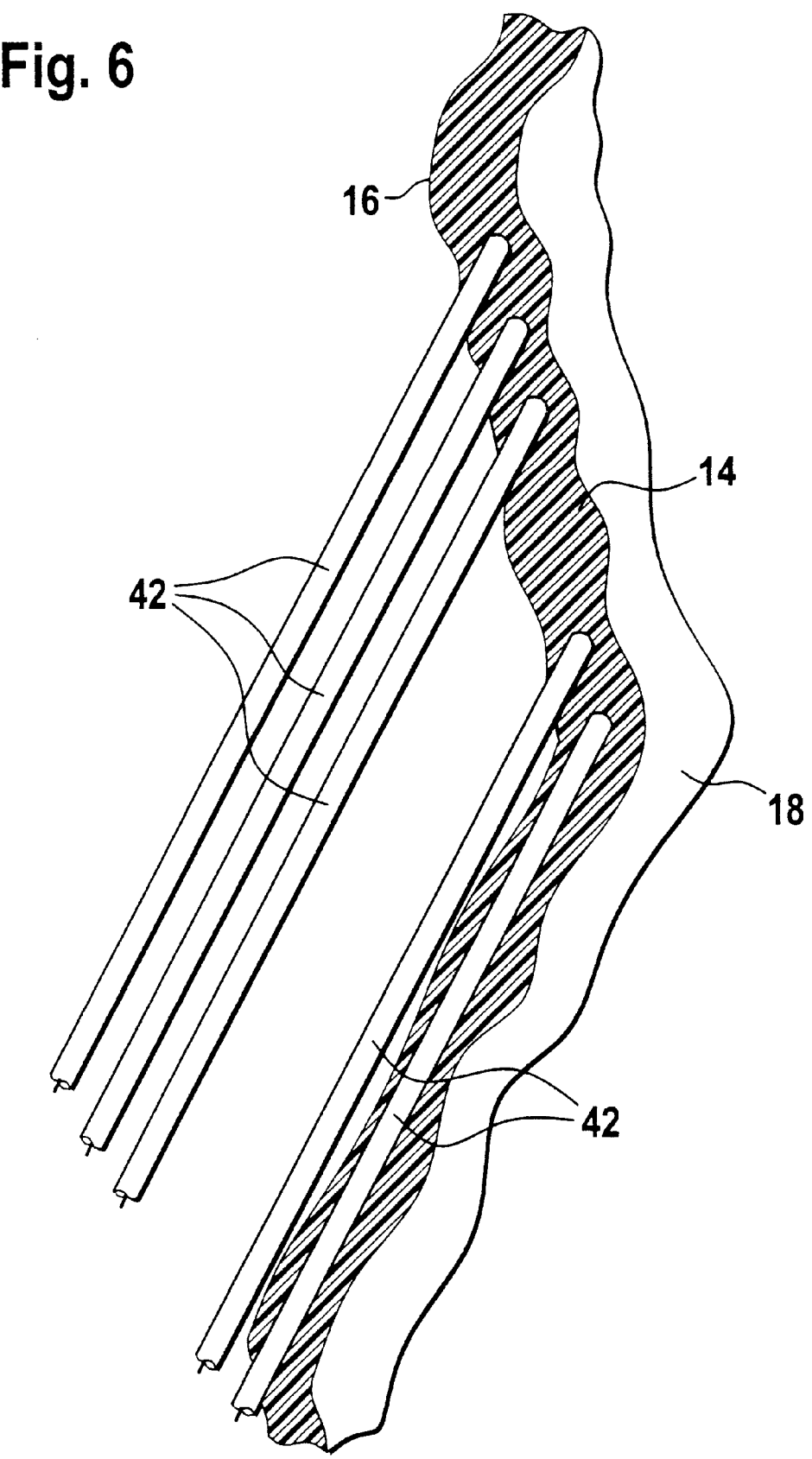
FIG. 6 is an enlarged detailed view of the portion of the panel and conductors enclosed by the square A in FIG. 5.

Further, in accordance with the present invention, the seat component 10 includes means 36 on the lower surface 18 of the panel 14 for interconnecting at least one and preferably a plurality of seat subassemblies (not shown) required for providing the desired seat functions with an on-board network (not shown) of the motor vehicle. More particularly, the interconnecting means 36 includes at least one and preferably a plurality of first sockets 38, for example being five in number, attached on the panel 14 for connection to the seat subassemblies, at least one second socket 40, preferably being larger in size than each of the first sockets 38, attached on the panel 14 for connection to the on-board network, and at least one and preferably a plurality of conductors 42 mounted in the panel and extending between and interconnecting the first and second sockets 38, 40. The synthetic material of the panel 14 permits the first and second clasps 32, 34 and the first and second sockets 38, 40 to preferably be integrally formed with the panel 14 and the conductors 42 to be molded into the panel 14 as seen in FIG. 6. However, other methods of attachment, such as by adhesion, can be employed. An example of a wiring scheme of the first sockets 38 to the second socket 40 by the conductors 42 is evident in FIG. 4. The conductors 42 are molded into the matrix of the synthetic panel 14, as is evident in the representation according to FIGS. 5 and 6, and are therefore protected against being damaged.

The smaller first sockets 38 may serve for connections to various mechanisms, for example, adjustment motors of the seat subassemblies. The connection to the on-board network of the motor vehicle is established via the larger second socket 40, with this second socket 40 providing not only inputs for the power lead-in wires but also inputs and outputs for data lines, in order to not only supply the seat subassemblies with corresponding control pulses, but also to be able to route return information from the seat (for example seat occupancy) to the on-board electronic system.

Additionally, the panel 14 by being clasped onto the suspension springs 26 in the manner described above serves the purpose of position-stabilizing the suspension springs 26 with respect to one another such that connection hooks for the suspension springs 26 which otherwise would be required can now be omitted.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A component of a motor vehicle seat, comprising:
   (a) a panel having opposite upper and lower surfaces, said upper surface being adapted for supporting a cushion padding of a motor vehicle seat;
   (b) means on said lower surface of said panel for attaching said panel upon an under spring structure of the motor vehicle seat to support said panel upon the under spring structure;
   (c) at least one first socket on said lower surface of said panel and being adapted for connecting to at least one seat subassembly required for a desired seat function;
   (d) at least one second socket on said lower surface of said panel for connecting to an on-board network of the motor vehicle; and
   (e) at least one conduct or in said panel extending between and connected to said first and second sockets.

2. The component of claim 1 wherein said panel is made of a synthetic material such that said first socket is integrally formed therewith.

3. The component of claim 1 wherein said panel is made of a synthetic material such that said first and second sockets are integrally formed therewith.

4. The component of claim 1 wherein said panel is made of a synthetic material such that said first and second sockets are integrally formed therewith and said conductor is molded into said panel.

5. The component of claim 1 wherein said panel has a curved profile formed in conformance with a compression contour of said seat.

6. The component of claim 1 wherein said attaching means includes a plurality of first clasps attached on said lower surface of said panel and extending therefrom, said first clasps being adapted for attaching said panel onto the under spring structure of the motor vehicle seat.

7. The component of claim 6 wherein said attaching means further includes a plurality of second clasps attached on said lower surface of said panel and extending therefrom, said clasps being adapted for attaching other structural parts on said panel.

8. A component of a motor vehicle seat, comprising:
    (a) an under spring structure for supporting a cushion padding of a motor vehicle seat;
    (b) a panel having opposite upper and lower surfaces and adapted for supporting the cushion padding on said upper surface of said panel;
    (c) means on said lower surface of said panel for fastening said panel upon said under spring structure so as to position said upper surface of said panel in an orientation for receiving the cushion padding thereon spaced above said under spring structure; and
    (d) means on said lower surface of said panel for interconnecting at least one seat subassembly required for a desired seat function with an on-board network.

9. The component of claim 8 wherein said means on said lower surface of said panel for fastening said panel upon said under spring structure includes a plurality of clasps attached on and extending downwardly from said lower surface of said panel.

10. The component of claim 9 wherein said under spring structure includes:
    a seating shell having a central cut-out region; and
    a plurality of suspension springs spanning said central region of said seating shell and having opposite ends mounted on said seating shell.

11. The component of claim 10 wherein said panel is disposed over said suspension springs above said central region of said seating shell with said clasps of said panel being secured onto said suspension springs.

12. The component of claim 9 wherein said panel is made of a synthetic material such that said clasps are integrally formed therewith.

13. The component of claim 8 wherein said means on said lower surface of said panel for interconnecting the at least one seat subassembly to the on-board network includes:
    at least one first socket attached on said panel for connection to the at least one seat subassembly function;
    at least one second socket attached on said panel for connection to the on-board network; and
    at least one conductor mounted in said panel and extending between and interconnecting said first and second sockets.

14. The component of claim 13 wherein said panel is made of a synthetic material such that said first and second sockets are integrally formed with said panel and said conductor is molded into said panel.

15. The component of claim 13 wherein said under spring structure includes:
    a seating shell having a central cut-out region; and
    a plurality of suspension springs spanning said central region of said seating shell and having opposite ends mounted on said seating shell.

16. The component of claim 15 wherein:
    said panel is disposed over said suspension springs above said central region of said seating shell; and
    said means on said lower surface of said panel for fastening said panel upon said under spring structure includes a plurality of clasps attached on and extending downwardly from said lower surface of said panel, said clasps of said panel being secured onto said suspension springs.

17. The component of claim 8 wherein said panel has a curved profile formed in conformance with a compression contour of the seat.

18. The component of claim 8 further comprising:
    means on said lower surface of said panel for fastening other structural parts on said panel.

19. The component of claim 18 wherein said means on said lower surface of said panel for fastening other structural parts on said panel includes a plurality of additional clasps attached on said lower surface of said panel, extending therefrom and being adapted for attaching other structural parts on said panel.

* * * * *